United States Patent
Mise et al.

(12) 
(10) Patent No.: US 6,717,623 B2
(45) Date of Patent: Apr. 6, 2004

(54) COLOR SEPARATOR CIRCUIT AND CHROMINANCE SIGNAL PROCESSING DEVICE PROVIDED THEREWITH

(75) Inventors: Tetsuo Mise, Hirakata (JP); Yukio Mori, Hirakata (JP); Seiji Okada, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 433 days.

(21) Appl. No.: 09/864,170

(22) Filed: May 25, 2001

(65) Prior Publication Data

US 2001/0045993 A1 Nov. 29, 2001

(30) Foreign Application Priority Data

May 26, 2000 (JP) ........................................ 2000-156854
Mar. 15, 2001 (JP) ........................................ 2001-074991

(51) Int. Cl.[7] ................................................. H04N 9/78
(52) U.S. Cl. ......................... 348/663; 348/665; 348/666
(58) Field of Search ................................. 348/663, 665, 348/667, 668, 666, 712, 713, 26, 234, 222.1, 252, 253, 625, 630, 631, 628, 629; 382/162, 167, 266; H04N 9/77, 9/78, 5/21

(56) References Cited

U.S. PATENT DOCUMENTS 5,285,267 A * 2/1994 Lim ............................ 348/663
5,508,741 A * 4/1996 Hieda ......................... 348/252
6,160,593 A * 12/2000 Nakakuki ..................... 348/713
6,288,754 B1 * 9/2001 Ito .............................. 348/663

* cited by examiner

*Primary Examiner*—Sherrie Hsia
(74) *Attorney, Agent, or Firm*—Arent Fox Kintner Plotkin & Kahn (57) ABSTRACT

In a color separator circuit, edge detection filters detect an edge encountered in the horizontal direction. When the image signals corresponding to the thus detected edge are processed, selector circuits 12a to 12c select outputs from small-tap-number color separation filters 8a to 8c and 10a to 10c, respectively. When the image signals corresponding to the remaining portion other than the edge are processed, the selector circuits 12a to 12c select outputs from large-tap-number color separation filters 9a to 9c and 11a to 11c, respectively. A ratio calculator circuit 16 calculates, from the luminance signals fed from adder circuits 13a to 13c, the value by which a multiplier circuit 18 performs multiplication. The multiplier circuit 18 multiplies, by this value calculated by the ratio calculator circuit 16, the color separation signals added together by an adder circuit 17 so that, of all the color separation signals of which there are two kinds, those of one kind are vertically interpolated.

14 Claims, 10 Drawing Sheets

COLOR SEPARATION FILTER 9a

FIG. 4H

COLOR SEPARATION FILTER 11a

COLOR SEPARATOR CIRCUIT AND CHROMINANCE SIGNAL PROCESSING DEVICE PROVIDED THEREWITH

BACKGROUND OF THE INVENTION

1. Field of the Invention

The present invention relates to a color separator circuit for separating colors to reproduce chrominance signals from image signals and to a chrominance signal processing device provided with such a color separator circuit. The present invention relates particularly to a color separator circuit that performs color separation on image signals output from a solid-state image-sensing device and to a chrominance signal processing device provided with such a color separator circuit.

2. Description of the Prior Art

Figure 6:
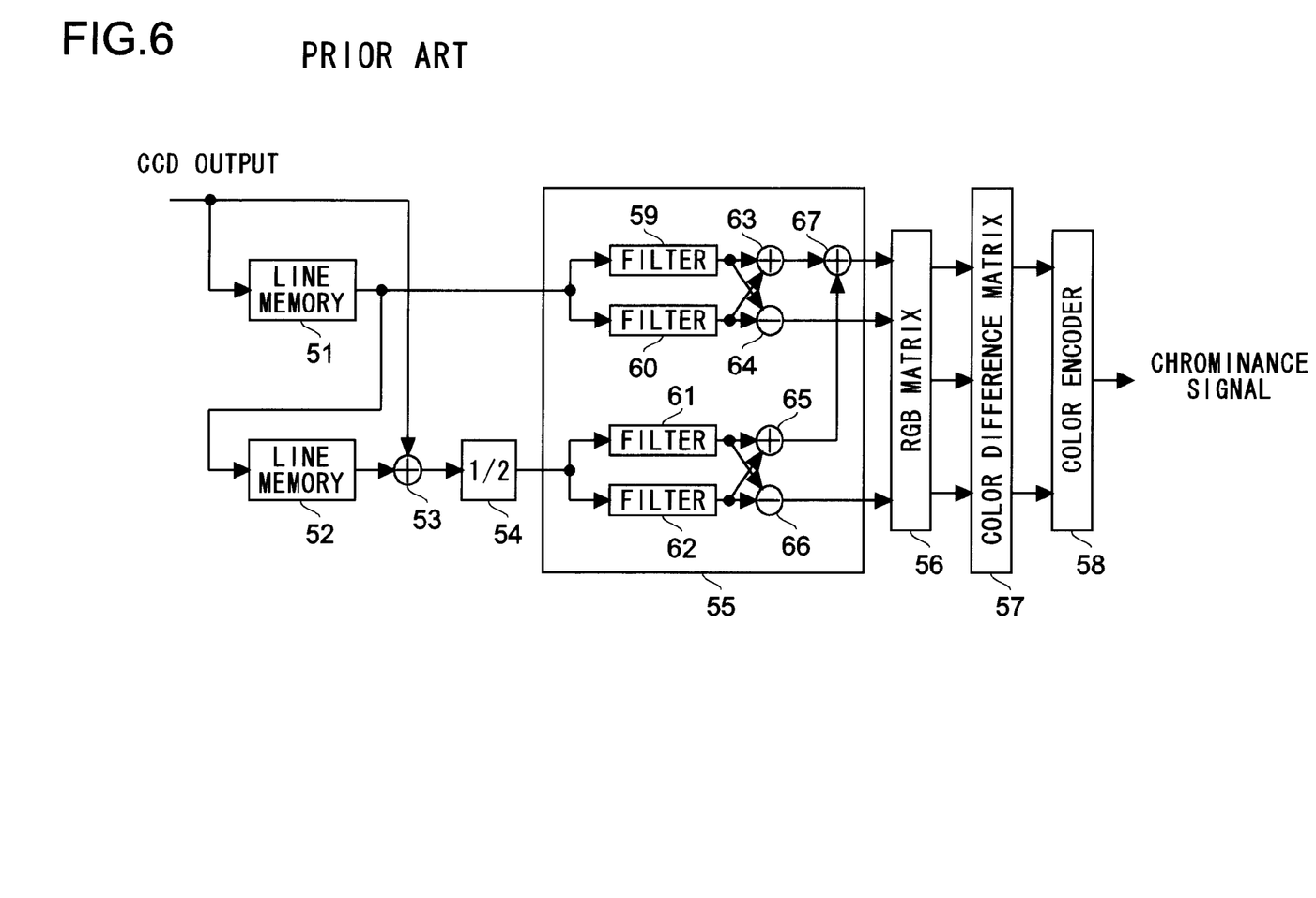
FIG. 6 is a block diagram showing the internal configuration of a conventional chrominance signal processing device.

When chrominance signals are produced from image signals output from a solid-state image-sensing device, such as a single-panel color CCD (charge-coupled device) or a two-panel color CCD, that is provided with a plurality of types of color filters, from the image signals obtained for each type of color filter, signals that are supposed to be obtained for the other types of color filter than the one provided for the pixels that are currently yielding image signals are produced by interpolating neighboring image signals. Then, by using the signals thus produced by interpolation and the image signals output from the CCD, color separation is performed, then primary color signals, i.e. R (red), G (green), and B (blue) signals are produced, then color difference signals R−Y and B−Y are produced, and eventually chrominance signals are produced FIG. 6 shows a conventional chrominance signal processing device that produces chrominance signals from image signals output from a CCD as described above. In the chrominance signal processing device shown in FIG. 6, when image signals are fed in from a CCD, they are fed to a line memory 51 and to an adder circuit 53. The image signals output from the line memory 51 are fed to a line memory 52 and to a color separator circuit 55, and the image signals output from the line memory 52 are fed to the adder circuit 53. In this way, image signals from one row after another are stored in the line memory 51 and then in the line memory 52. The adder circuit 53 is fed with the image signals of the first row from the line memory 52 and the image signals of the third row directly from the CCD, and the image signals added together by the adder circuit 53 then have their signal levels multiplied by ½ by a multiplier circuit 54 so that the image signals of the first and third rows are averaged. Then, the image signals output from the multiplier circuit 54 and the image signals of the second row output from the line memory 51 are fed to the color separator circuit 55.

The color separator circuit 55 produces, for each image signal, three signals, namely a luminance signal YL and two color separation signals Cr and Cb, and feeds them to an RGB matrix circuit 56. From the luminance signal YL and the color separation signals Cr and Cb, the RGB matrix circuit 56 produces primary color signals, namely R, G, and B signals, from which a color difference matrix circuit 57 then produces color difference signals R−Y and B−Y. These color difference signals R−Y and B−Y are fed to a color encoder 58, which then produces and outputs chrominance signals.

The color separator circuit 55 is provided with color separation filters 59 and 60 for interpolating or correcting the image signals fed from the line memory 51 in the horizontal direction, color separation filters 61 and 62 for interpolating or correcting the image signals fed from the adder circuit 53 in the horizontal direction, an adder circuit 63 for adding together the outputs from the color separation filters 59 and 60, a subtractor circuit 64 for calculating the difference between the outputs from the color separation filters 59 and 60, an adder circuit 65 for adding together the outputs from the color separation filters 61 and 62, a subtractor circuit 66 for calculating the difference between the outputs from the color separation filters 61 and 62, and an adder circuit 67 for adding together the outputs of the adder circuits 63 and 65.

Figure 3:
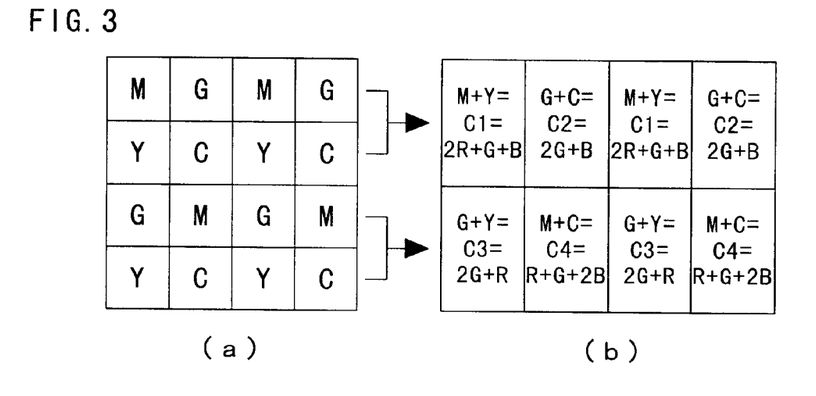
FIG. 3 is a diagram showing the relationship between the color filters provided one for each of the pixels of the CCD and the image signals output from the CCD.

Suppose that the chrominance signal processing device configured as described above is fed with image signals output from a CCD provided with four types of color filters, namely M (magenta), G (green), Y (yellow), and C (cyan) color filters, as shown at (a) in FIG. 3. As shown at (a) in FIG. 3, the CCD has two types of columns of color filters arranged alternately, specifically columns in which color filters are arranged in the order of M, Y, G, and Y and columns in which color filters are arranged in the order of G, C, M, and C. Moreover, the CCD outputs image signals obtained from two adjacent rows in combination. Specifically, as shown at (b) in FIG. 3, for every two rows, the CCD outputs image signals M+Y, G+C, G+Y, and M+C.

Let these image signals be expressed also as C1=M+Y, C2=G+C, C3=G+Y, and C4=M+C, respectively. Where image signals are output in this way, the colors M, C, and Y are expressed, in terms of primary colors R (red), G (green), and B (blue), as M=R+B, C=G+B, and Y=R+G, respectively. Hence, the image signals C1, C2, C3, and C4 are expressed, in terms of primary colors R, G, and B, as C1=2R+G+B, C2=2G+B, C3=2G+R, and C4=2B+G+R, respectively.

When image signals have been fed in in this way, for example, the chrominance signals for pixels that yield the image signals C1 are produced in the following manner. First, the image signals C1 and C2 stored in the line memory 52 are fed to the color separation filters 59 and 60. Thus, the color separation filters 59 and 60 output the interpolated or corrected image signals C1 and C2. On the other hand, the image signals C3 and C4 fed directly from the CCD and the image signals C3 and C4 fed from the line memory 51 are averaged by the adder circuit 53 and the multiplier circuit 54, and are then fed to the color separation filters 61 and 62. Thus, the color separation filters 61 and 62 output the interpolated or corrected image signals C3 and C4.

When the image signals C2 to C4 for the pixels that yield the image signals C1 have been calculated plausibly in this way, the adder circuit 63 adds together the image signals C1 and C2, and the subtractor circuit 64 calculates the differences between the image signals C1 and C2. Simultaneously, the adder circuit 65 adds together the image signals C3 and C4, and the subtractor circuit 66 calculates the differences between the image signals C3 and C4. Then the outputs from the adder circuits 63 and 65 are added together by the adder circuit 67 to produce luminance signals YL, and the subtractor circuits 64 and 66 output color separation signals Cr and Cb, respectively. When the luminance signals YL and the color separation signals Cr and Cb have been produced in this way, the RGB matrix circuit 56 produces primary color signals, then the color difference matrix circuit 57 produces color difference signals, and then the color encoder 58 produces and outputs chrominance signals.

In the chrominance signal processing device shown in FIG. 6, the color separation filters 59 to 62 provided in the color separator circuit 55 thereof are each designed as a filter that performs calculation on three horizontally adjacent image signals, i.e. a target image signal and the image signals immediately preceding and succeeding it, with the color separation filters 59 and 61 given filtering characteristics (0, 2, 0) and the color separation filters 60 and 62 given filtering characteristics (1, 0, 1).

Suppose that a color separation filter is given filtering characteristics (a, b, c), that the image signal from the pixel for which the chrominance signals are currently being calculated has a signal level "cb", and that the image signals output immediately before and after this image signal having the signal level "cb" have signal levels "ca" and "cc", respectively. Then, the color separation filter having these filtering characteristics produces and outputs an image signal having a signal level "a×ca+b×cb+c×cc". In the filtering characteristics (a, b, c) of a color separation filter, the components, here "b", and "c", are called "taps", of which the number represents the number of image signals that the color separation filter uses to produce a signal.

Figure 7A:
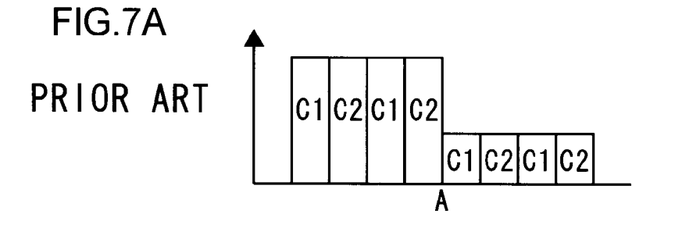
FIGS. 7A to 7J are diagrams showing how signals are processed by the color separator circuit provided in the chrominance signal processing device shown in FIG. 6.
Figure 7B:
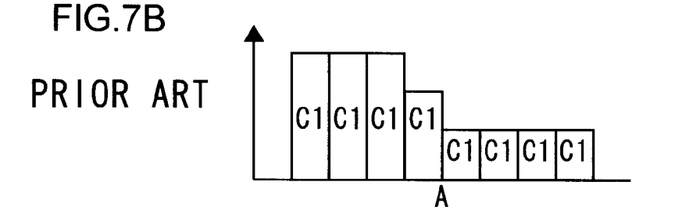
Figure 7C:
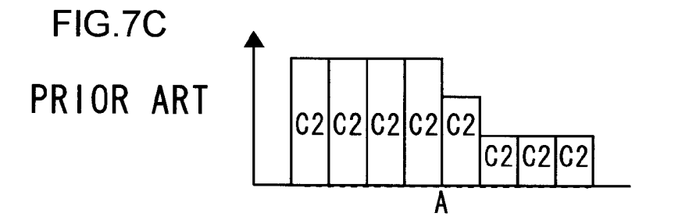

Thus, with the color filters 59 to 62 having the filtering characteristics (0, 2, 0) and (1, 0, 1) as described above, for example, when image signals C1 and C2 of which the signal levels vary as shown in FIG. 7A are fed to the color separation filters 59 and 60, they are output with their signal levels interpolated as shown in FIGS. 7B and 7C. Accordingly, when an edge is encountered at a position A between the fourth and fifth columns of pixels as shown in FIG. 7A, the image signals C1 and C2 immediately preceding and succeeding the position A are averaged and thereby interpolated by the image signals C1 and C2 preceding and succeeding them.

Figure 7D:
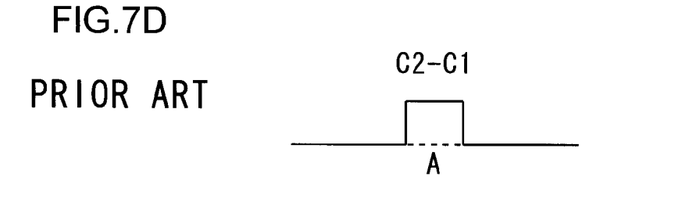
Figure 7E:
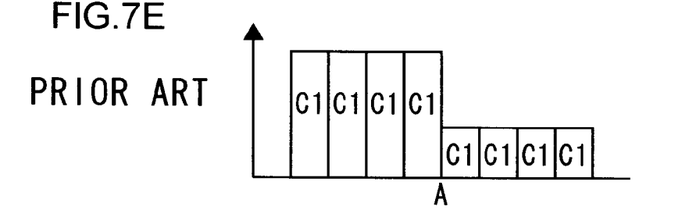
Figure 7F:
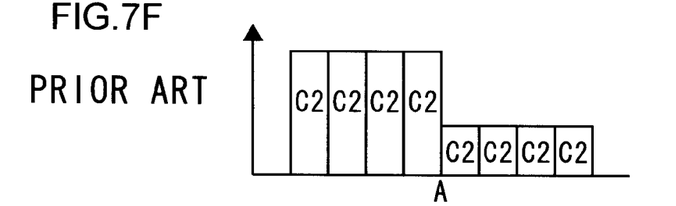
Figure 7G:
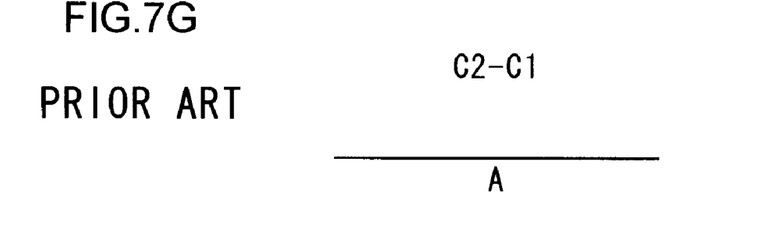

The image signals C1 and C2 thus interpolated and output from the color separation filters 59 and 60 are fed to the subtractor circuit 64, which then subtracts the image signals C1 from the image signals C2 and thereby produces color separation signals Cr. Here, whereas ideally the signal levels of the color separation signals Cr should remain 0 all the time as shown in FIGS. 7E, 7F, and 7G, in reality they become greater than 0 around the edge encountered at the position A as shown in FIGS. 7B, 7C, and 7D, and thus contain certain non-zero components. This causes the edge to appear falsely colored.

Figure 7H:
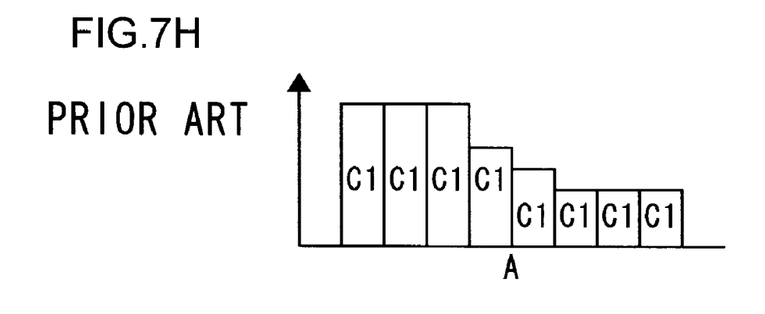
Figure 7I:
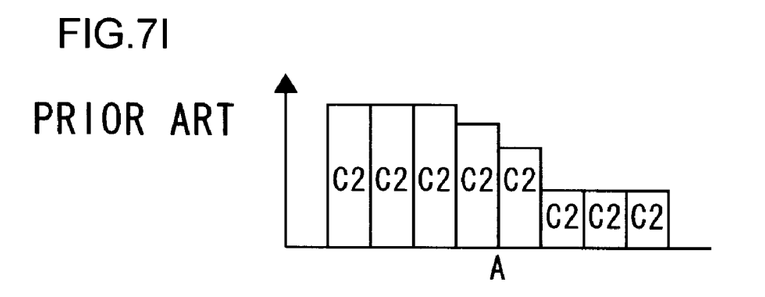
Figure 7J:
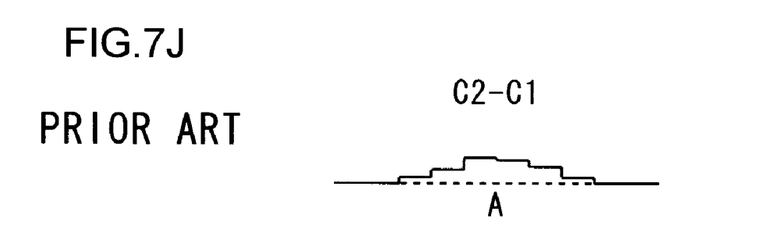

On the other hand, with the color separation filters 59 to 62 given a larger number of taps, when image signals C1 and C2 as shown in FIG. 7A are fed thereto, they are interpolated and output as shown in FIGS. 7H and 7I. Here, the levels of the image signals C1 and C2 that are actually output are themselves corrected by the image signals preceding and succeeding them. Thus, the levels of the image signals C1 and C2 that are actually output themselves vary, and as a result the signal levels of the color separation signals Cr are closer to the ideal value around the edge as shown in FIG. 7J than is shown in FIG. 7D. This helps alleviate the false coloring of the edge. However, the color separation signals thus obtained have signal levels deviated from the ideal value on the whole, and thus the portion of the image corresponding thereto is falsely colored on the whole.

As described above, in interpolating image signals in the horizontal direction, using color separation filters with a small number of taps causes the signal levels of the color separation signals to deviate greatly from the ideal value around an edge, and using color separation filters with a large number of taps causes the signal levels of the color separation signals to deviate from the ideal value on the whole. Thus, in either case, false coloring occurs.

Figure 8A:
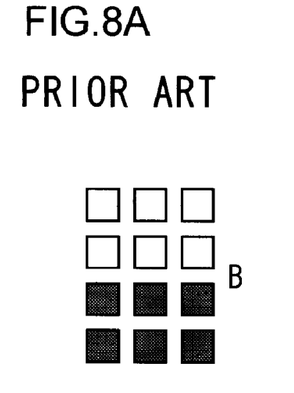
FIGS. 8A to 8G are diagrams showing how signals are processed by the color separator circuit provided in the chrominance signal processing device shown in FIG. 6.
Figure 8B:
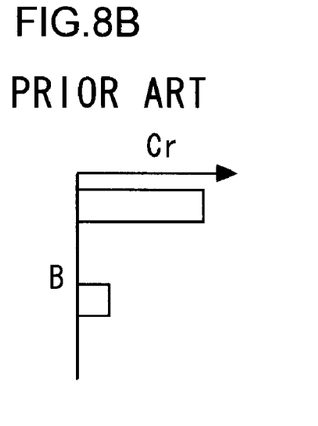
Figure 8C:
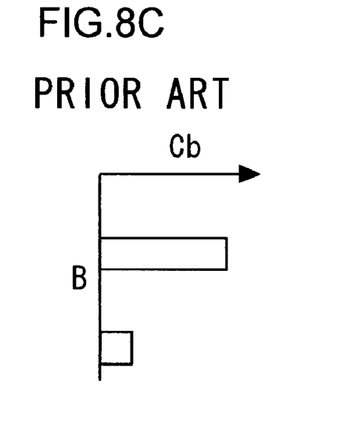

On the other hand, in the vertical direction, the image signals fed directly from the CCD and the image signals fed from the line memory 52 are averaged and thereby linearly interpolated by the adder circuit 53 and the multiplier circuit 54. As a result, when the subtractor circuit 64 outputs color separation signals Cr, the subtractor circuit 66 outputs linearly interpolated color separation signals Cb. Now, suppose that, as shown in FIG. 8A, an edge is encountered at a position B between the second and third rows. Then, the subtractor circuit 64 outputs color separation signals Cr for the first and third rows and color separation signals Cb for the second and fourth rows, respectively having signal levels as shown in FIGS. 8B and 8C.

Figure 8D:
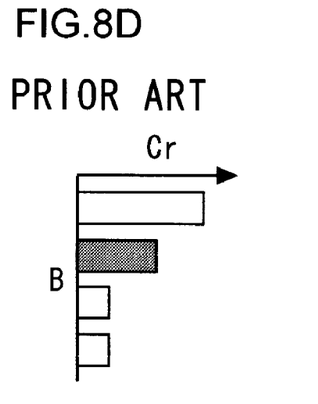
Figure 8E:
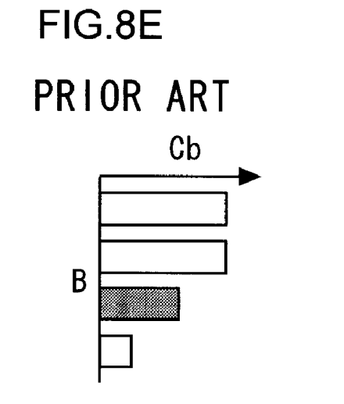
Figure 8F:
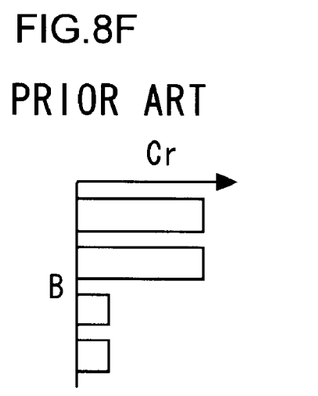
Figure 8G:
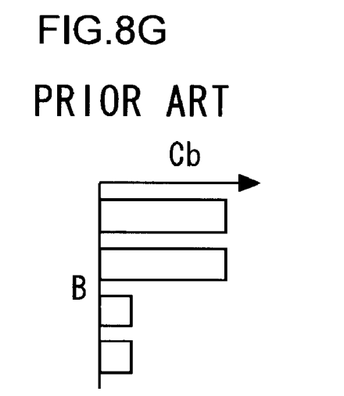

Here, as shown in FIGS. 8D and 8E, the signal level of the color separation signal Cr of the second row output from the subtractor circuit 66 is equal to the value obtained by linearly interpolating the signal levels of the color separation signals Cr of the first and third rows, and the signal level of the color separation signal Cb of the third row output from the subtractor circuit 66 is equal to the value obtained by linearly interpolating the signal levels of the color separation signals Cb of the second and fourth rows. Since an edge is encountered at the position B now, the ideal values of the signal levels of the color separation signals Cr and Cb are as shown in FIGS. 8F and 8G. As will be clear from comparison between what is shown in FIGS. 8D and 8E and what is shown in FIGS. 8F and 8G, the color separation signal Cr of the second row and the color separation signal Cb of the third row have signal levels either lower or higher than their ideal values. Thus, when linear interpolation is performed in this way, false coloring occurs in the vertical direction also.

SUMMARY OF THE INVENTION

An object of the present invention is to provide a color separator circuit and a chrominance signal processing device that alleviate false coloring when image signals for a plurality of types of color filters are obtained by interpolation and chrominance signals are produced from such image signals.

To achieve the above object, according to one aspect of the present invention, a color separator circuit for performing color separation on image signals fed thereto from a solid-state image-sensing device having pixels provided with a plurality of types of color filters is provided with: a contour detector for detecting the contour of a subject sensed by the solid-state image-sensing device by recognizing variations in the signals levels of the image signals fed from the solid-state image-sensing device; a first color separation filter for correcting the image signals fed from the solid-state image-sensing device by correcting each image signal based on a plurality of preceding and succeeding image signals; a second color separation filter for correcting the image signals fed from the solid-state image-sensing device by correcting each image signal based on a plurality of preceding and succeeding image signals; and a selector for selecting the second color separation filter when correcting image signals that represent a portion of an image that corresponds to the contour detected by the contour detector and selecting the first color separation filter when correcting image signals that represent a portion of the image other than the portion corresponding to the contour. Here, the first color separation filter uses a smaller number of image signals to correct an image signal than the second color separation filter.

According to another aspect of the present invention, in a chrominance signal processing device that produces chrominance signals based on signals output from a color separator circuit provided therein, the color separator circuit is provided with: a contour detector for detecting the contour of a subject sensed by a solid-state image-sensing device having pixels provided with a plurality of types of color filters by recognizing variations in the signals levels of image signals fed from the solid-state image-sensing device to the contour detector; a first color separation filter for correcting the image signals fed from the solid-state image-sensing device by correcting each image signal based on a plurality of preceding and succeeding image signals; a second color separation filter for correcting image signals fed from the solid-state image-sensing device by correcting each image signal based on a plurality of preceding and succeeding image signals; and a selector for selecting the second color separation filter when correcting image signals that represent a portion of an image that corresponds to the contour detected by the contour detector and selecting the first color separation filter when correcting image signals that represent a portion of the image other than the portion corresponding to the contour. Here, the first color separation filter uses a smaller number of image signals to correct an image signal than the second color separation filter.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
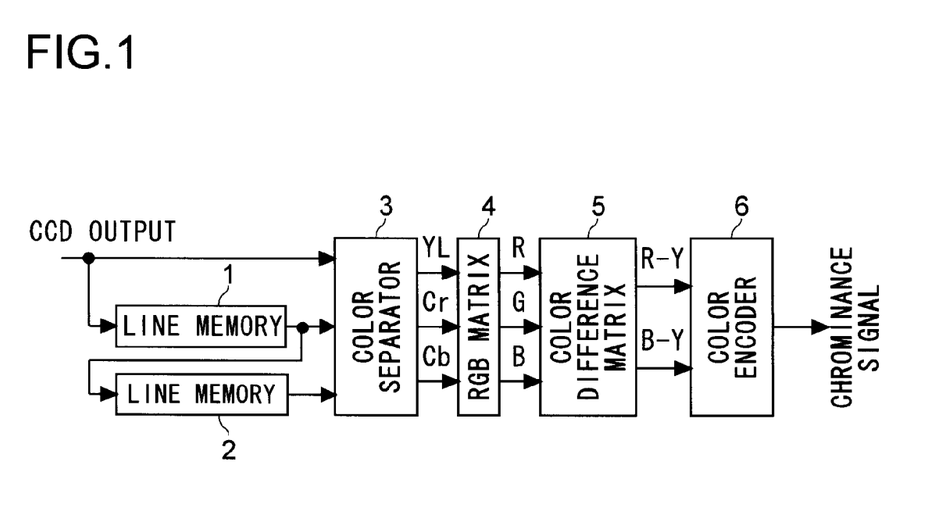
FIG. 1 is a block diagram showing the internal configuration of a chrominance signal processing device embodying the invention.
Figure 2:
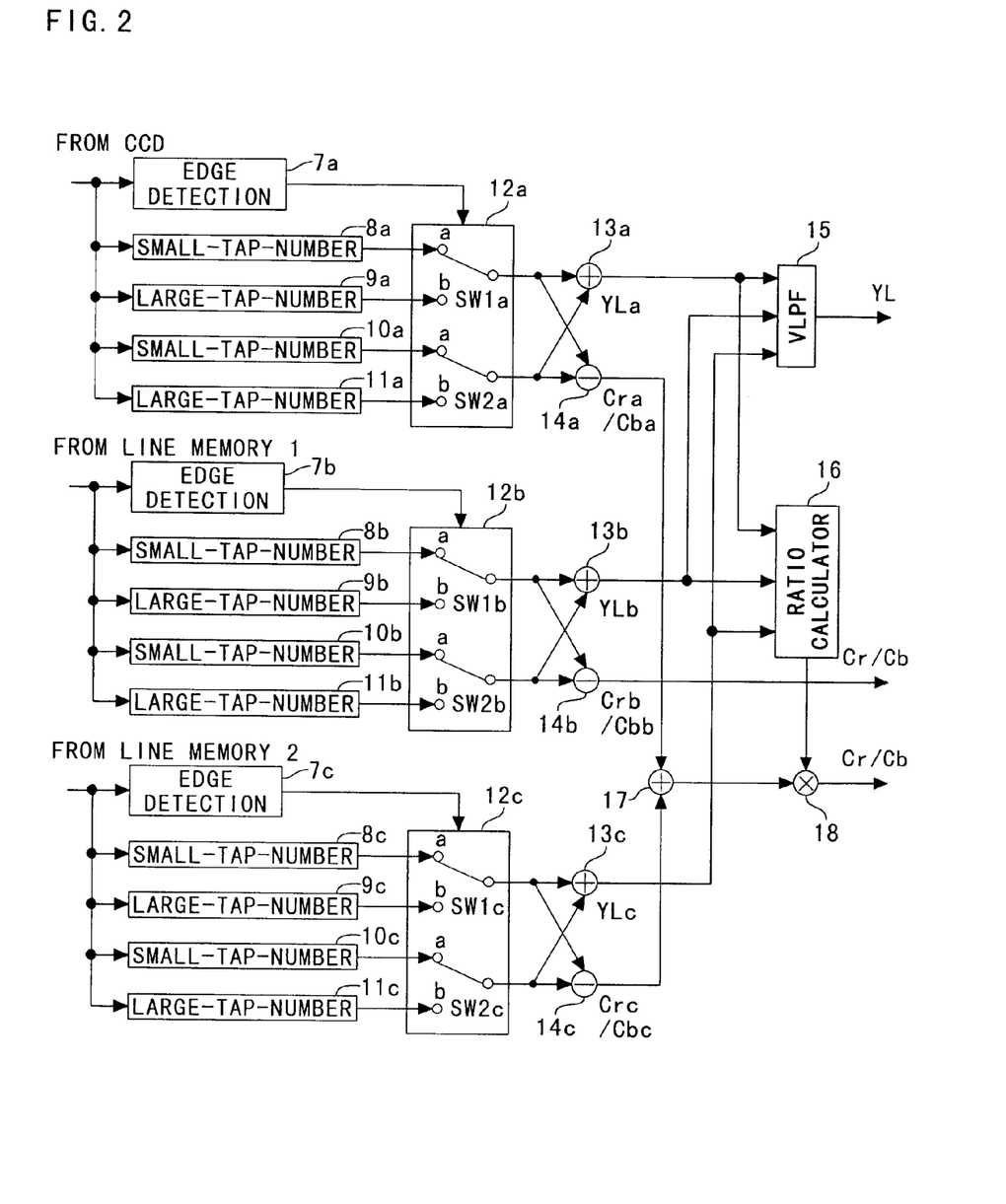
FIG. 2 is a block diagram showing the internal configuration of the color separator circuit provided in the chrominance signal processing device shown in FIG. 1.

Hereinafter, an embodiment of the present invention will be described with reference to the drawings. FIG. 1 is a block diagram showing the internal configuration of the chrominance signal processing device of the embodiment. FIG. 2 is a block diagram showing the internal configuration of the color separator circuit provided in the chrominance signal processing device shown in FIG. 1.

Configuration and Operation of the Chrominance Signal Processing Device

The chrominance signal processing device shown in FIG. 1 is provided with a line memory 1 for storing image signals output from a CCD, a line memory 2 for storing the image signals output from the line memory 1, a color separator circuit 3 that is fed with image signals constituting three vertically adjacent rows from the CCD and from the line memories 1 and 2, an RGB matrix circuit 4 for producing primary color signals, i.e. R, G, and B signals, from the luminance signals YL and the color separation signals Cr and Cb output from the color separation circuit 3, a color difference matrix circuit 5 for producing color difference signals R–Y and B–Y from the primary color signals R, G, and B output from the RGB matrix circuit 4, and a color encoder 6 for producing chrominance signals from the color difference signals R–Y and B–Y output from the color difference matrix circuit 5.

In this chrominance signal processing device configured as described above, when image signals are received from the CCD, they are fed to the line memory 1 and to the color separator circuit 3. In the line memory 1 are stored horizontally adjacent image signals that together constitute a row. The image signals output from the line memory 1 are fed to the line memory 2 and to the color separator circuit 3, so that horizontally adjacent image signals that together constitute a row are stored in the line memory 2 also. The image signals output from the line memory 2 are, like those output from the line memory 1, fed to the color separator circuit 3. In this way, the color separator circuit 3 is fed with the image signals of a first row from the line memory 2, the image signals of a second row from the line memory 1, and the image signals of a third row from the CCD, and thus receives image signals constituting three vertically adjacent rows.

Now, suppose that, as described previously, the CCD has color filters M, G, C, and Y arranged as shown at (a) in FIG. 3 and outputs image signals C1 to C4 as shown at (b) in FIG. 3. Then, the color separator circuit 3, on the basis of the plurality of image signals fed thereto from the CCD and from the line memories 1 and 2, produces a luminance signal YL and color separation signals Cr and Cb for each of those image signals. As a luminance signal YL and color separation signals Cr and Cb are produced for each image signal, the RGB matrix circuit 4, on the basis of the thus produced signals, produces primary color signals R, G, and B.

Then, on the basis of these primary color signals R, G, and B, the color difference matrix circuit 5 produces color difference signals R–Y and B–Y (where R–Y=0.70 R–0.59 G–0.11 B and B–Y=–0.30 R–0.59 G+0.89 B). These color difference signals R–Y and B–Y are fed to the color encoder 6, which then forms those signals into signals having a phase difference of 90° relative to each other and then mixes them together to produce and output chrominance signals. In this chrominance signal processing device, the color separator circuit 3 is configured and operates as described below.

Configuration of the Color Separator Circuit

As shown in FIG. 2, the color separator circuit 3 is provided with an edge detection filter 7a and color separation filters 8a, 9a, 10a, and 11a that are fed with image signals from the CCD, an edge detection filter 7b and color separation filters 8b, 9b, 10b, and 11b that are fed with image signals from the line memory 1, and an edge detection filter 7c and color separation filters 8c, 9c, 10c, and 11c that are fed with image signals from the line memory 2. Of these color separation filters, the color separation filters 8a, 10a, 8b, 10b, 8c, and 10c are small-tap-number filters having a small number of taps, and the color separation filters 9a, 11a, 9b, 11b, 9c, and 11c are large-tap-number filters having a large number of taps The color separator circuit 3 is further provided with a selector circuit 12a consisting of a switch SW1a for choosing between the image signals from the color separation filters 8a and 9a and a switch SW2a for choosing between the image signals from the color separation filters 10a and 11a, a selector circuit 12b consisting of a switch SW1b for choosing between the image signals from the color separation filters 8b and 9b and a switch SW2b for choosing between the image signals from the color separation filters 10b and 11b, and a selector circuit 12c consisting of a switch SW1c for choosing between the image signals from the color separation filters 8c and 9c and a switch SW2c for choosing between the image signals from the color separation filters 10c and 11c. This makes it possible to choose between the image signals obtained from the small-tap-number filters and those obtained from the large-tap-number filters. The selecting operation of the selector circuits 12a, 12b, and 12c is controlled according to the signals fed individually thereto from the edge detection filters 7a to 7c.

Two image signals chosen by the selector circuit 12a are added together by an adder circuit 13a, and their difference is calculated by a subtractor circuit 14a, two image signals chosen by the selector circuit 12b are added together by an adder circuit 13b, and their difference is calculated by a subtractor circuit 14b, and two image signals chosen by the selector circuit 12c are added together by an adder circuit 13c, and their difference is calculated by a subtractor circuit 14c. Then, the outputs of the adder circuits 13a, 13b, and 13c are fed to a vertical-direction low-pass filter (hereinafter abbreviated to "VLPF") 15 and to a ratio calculator circuit 16. The outputs of the subtractor circuits 14a and 14c are added together by an adder circuit 17, and then the result is multiplied, by a multiplier circuit 18, by the ratio calculated by the ratio calculator circuit 16. As a result, the VLPF 15 outputs a luminance signal YL, one of the subtractor circuit 14b and the multiplier circuit 18 outputs a color separation signal Cr, and the other of the subtractor circuit 14b and the multiplier circuit 18 outputs a color separation signal Cb.

The operation of the color separator circuit 3 configured as described above will be described below, in particular from the perspective of how it achieves reduction of false coloring that occurs both in the horizontal and vertical directions.

How False Coloring in the Horizontal Direction is Reduced

Reduction of false coloring in the horizontal direction is performed by the edge detection filters 7a to 7c, the color separation filters 8a to 8c, 9a to 9c, 10a to 10c, and 11a to 11c, and the selector circuits 12a to 12c. Here, it is assumed that the color separation filters 8a to 8c have filtering characteristics (0, x1, 0) and the color separation filters 10a to 10c have filtering characteristics (x2, 0, x3), where x1 to x3 are values that fulfill the relation x1=x2+x3. Moreover, it is assumed that the color separation filters 9a to 9c have filtering characteristics (0, y1, 0, y2, 0, y3, 0) and the color separation filters 10a to 10c have filtering characteristics (y4, 0, y5, 0, y6, 0, y7), where y1 to y7 are values that fulfill the relation y1+y2+y3=y4+y5+y6+y7.

The edge detection filters 7a to 7c, the color separation filters 8a to 8c, 9a to 9c, 10a to 10c, and 11a to 11c, and the selector circuits 12a to 12c operate in the same manner, and therefore the following descriptions deal with, as their representatives, only the operation of the edge detection filter 7a, the color separation filters 8a, 9a, 10a, and 11a, and the selector circuit 12a.

Figure 4A:
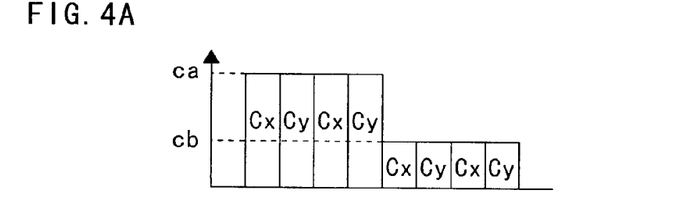
FIGS. 4A to 4M are diagrams showing how signals are processed by the color separator circuit shown in FIG. 2.

Suppose that image signals Cx and Cy including an edge at a position A between the fourth and fifth columns as shown in FIG. 4A, like those shown in FIG. 7A, are fed to the edge detection filter 7a and to the color separation filters 8a to 11a. Here, it is assumed that the image signals Cx and Cy of the first to fourth columns all have a signal level "ca" and the image signals Cx and Cy of the fifth to eighth columns all have a signal level "cb". Moreover, it is assumed that the image signals preceding the first column have a signal level "ca" and the image signals succeeding the eighth column have a signal level "cb". Moreover, if it is assumed that the image signals Cx are image signals C1, C2, C3, and C4, then the image signals Cy are image signals C2, C1, C4, and C3.

1. Edge Detection Filters

Figure 4B:
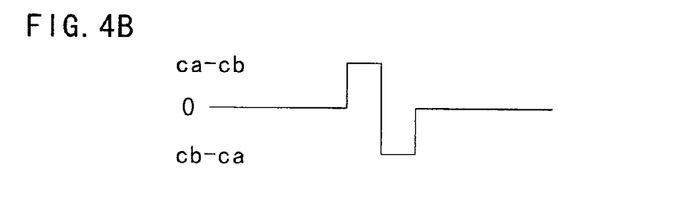

First, the edge detection filter 7a detects the edge at the position A in the image signals Cx and Cy, which are fed in alternately, and feeds a control signal to the selector circuit 12a. Here, the edge detection filter 7a is given filtering characteristics (−1, 2, −1) to make it possible to extract the edge from the image signals, which are fed in continuously. Specifically, when the edge detection filter 7a receives three image signals that have signal levels c1, c2, and c3, respectively, it performs calculation c1×(−1)+c2×2+c3×(−1). Thus, when the edge detection filter 7a receives image signals Cx and Cy of which the signal levels vary as shown in FIG. 4A, it yields calculation results as shown in FIG. 4B.

Specifically, the calculation results are ca×(−1)+ca×2+ca×(−1)=0 for the first to third columns, ca×(−1)+ca×2+cb×(−1)=ca−cb for the fourth column, ca×(−1)+cb×2+cb×(−1)=cb−ca for the fifth column, and cb×(−1)+cb×2+cb×(−1)=0 for the sixth to eighth columns. In this way, the calculation results are non-zero at the edge encountered at the position A. Each of the results E1 of the calculation performed by the edge detection filter 7a is checked to determine whether −Th≦E1≦Th or not, and, if E1<−Th or E1>Th, an edge is recognized to exist. In the case of the example shown in FIGS. 4A to 4M, if it is assumed that ca−cb>Th, an edge is recognized to exist in the fourth and fifth columns.

2. Small-tap-number Color Separation Filters

Figure 4C:
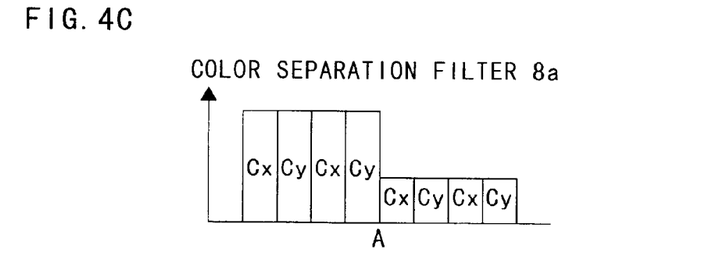
Figure 4D:
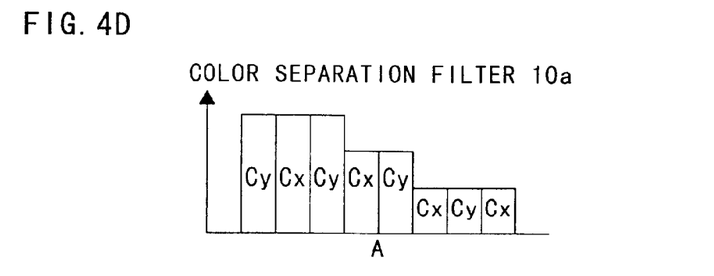

When the color separation filter 8a receives three image signals having signal levels c1, c2, and c3, respectively, it performs calculation c1×0+c2×x1+c3×0=c2×x1. When the color separation filter 10a receives, as the color separation filter 8a does, three image signals having signal levels c1, c2, and c3, respectively, it performs calculation c1×x2+c2×0+c3×x3=c1×x2+c3×x3. Thus, when the color separation filters 8a and 10a receive image signals Cx and Cy of which the signal levels vary as shown in FIG. 4A, they yield calculation results as shown in FIGS. 4C and 4D.

Specifically, the color separation filter 8a outputs image signals Cx and Cy having a signal level ca×x1 for the first to fourth columns and image signals Cx and Cy having a signal level cb×x1 for the fifth to eighth columns. On the other hand, the color separation filter 10a outputs image signals Cx and Cy having a signal level ca×(x2+x3)=ca×x1 for the first to third columns, an image signal Cx having a signal level ca×x2+cb×x3 for the fourth column, an image signal Cy having a signal level ca×x2+cb×x3 for the fifth column, and image signals Cx and Cy having a signal level cb×(x2+x3)=cb×x1 for the sixth to eighth columns.

Figure 4E:
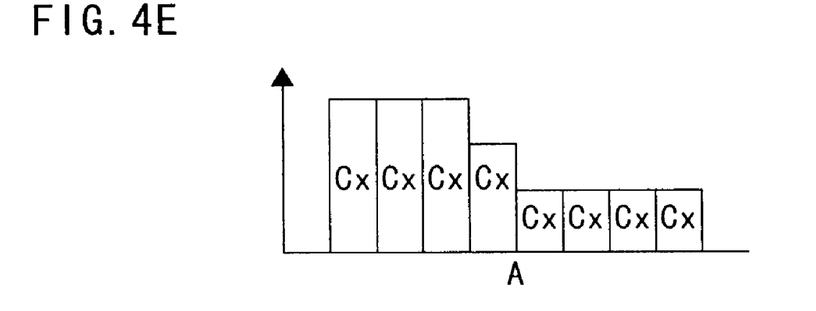
Figure 4F:
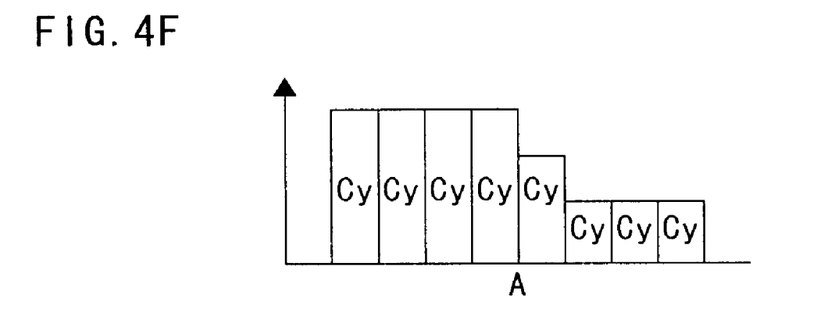

As a result, the image signals Cx and Cy fed to the selector circuit 12a have signal levels as shown in FIGS. 4E and 4F. Specifically, for the first to third columns, the image signals Cx and Cy both have a signal level ca×x1, and, for the sixth to eighth columns, the image signals Cx and Cy both have a signal level cb×x1. For the fourth column, the image signal Cx has a signal level ca×x2+cb×x3 and the image signal Cy has a signal level ca×x1. For the fifth column, the image signal Cx has a signal level ca×x1 and the image signal Cy has a signal level ca×x2+cb×x3.

3. Large-tap-number Color Separation Filters

Figure 4G:
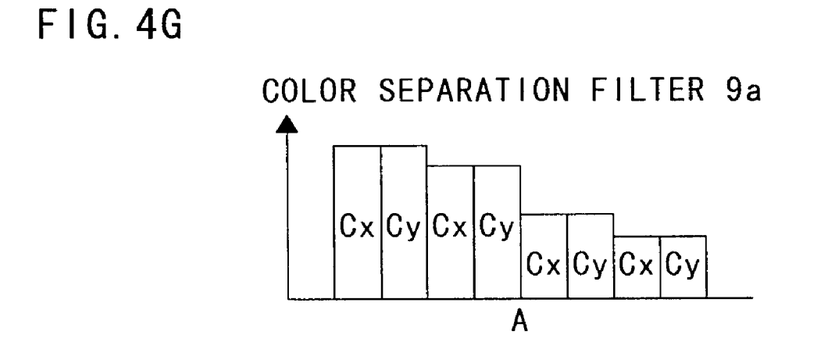
Figure 4H:
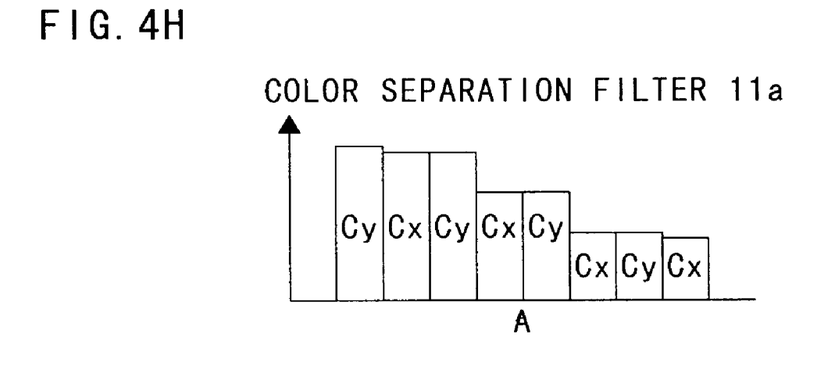

When the color separation filter 9a receives seven image signals having signal levels c1, c2, c3, c4, c5, c6, and c7, respectively, it performs calculation c1×0+c2×y1+c3×0+c4×y2+c5×0+c6×y3+c7×0=c2×y1+c4×y2+c6×y3. When the color separation filter 11a receives, as the color separation filter 9a does, seven image signals having signal levels c1, c2, c3, c4, c5, c6, and c7, respectively, it performs calculation c1×y4+c2×0+c3×y5+c4×0+c5×y6+c6×0+c7×y7=c1×y4+c3×y5+c5×y6+c7×y7. Thus, when the color separation filters 9a and 11a receive image signals Cx and Cy of which the signal levels vary as shown in FIG. 4A, they yield calculation results as shown in FIGS. 4G and 4H.

Specifically, the color separation filter 9a outputs image signals Cx and Cy having a signal level ca×(y1+y2+y3) for the first and second columns, image signals Cx and Cy having signal levels ca×(y1+y2)+cb×y3 for the third and fourth columns, image signals Cx and Cy having signal levels ca×y1+cb×(y2+y3) for the fifth and sixth columns, and image signals Cx and Cy having signal levels cb×(y1+y2+y3). On the other hand, the color separation filter 11a outputs an image signal Cy having a signal level ca×(y4+y5+y6+y7)=ca×(y1+y2+y3) for the first column, image signals Cx and Cy having a signal level ca×(y4+y5+y6)+cb×y7 for the second and third columns, image signals Cx and Cy having a signal level ca×(y4+y5)+cb×(y6+y7) for the fourth and fifth columns, image signals Cx and Cy having a signal level ca×y4+cb×(y5+y6+y7) for the sixth and seventh columns, and an image signal Cx having a signal level cb×(y4+y5+y6+y7)=cb×(y1+y2+y3).

Figure 4I:
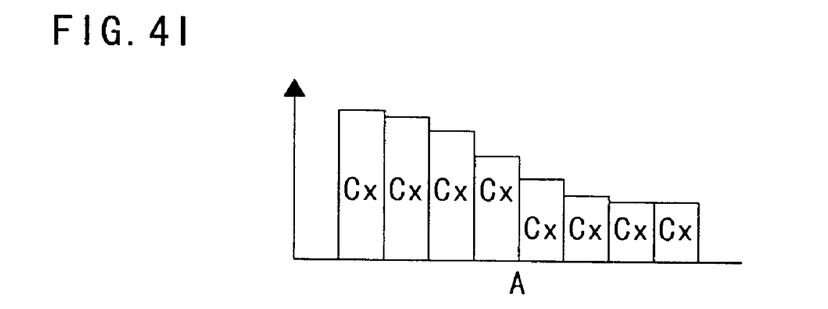
Figure 4J:
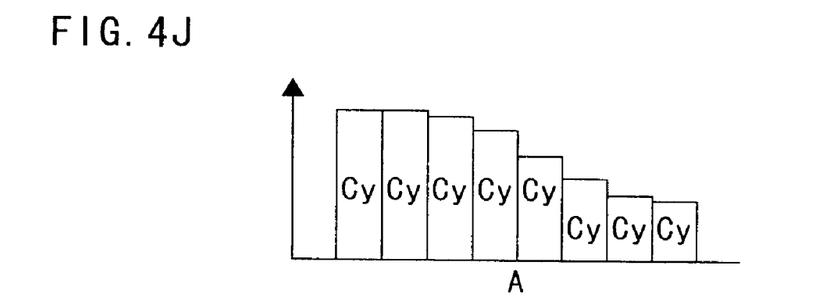

As a result, the image signals Cx and Cy fed to the selector circuit 12a have signal levels as shown in FIGS. 4I and 4J. Specifically, for the first column, the image signals Cx and Cy both have a signal level ca×(y1+y2 +y3), and, for the eighth column, the image signals Cx and Cy both have a signal level cb×(y1+y2+y3). For the second column, the image signal Cx has a signal level ca×(y4+y5+y6)+cb×y7 and the image signal Cy has a signal level ca×(y1+y2+y3). For the third column, the image signal Cx has a signal level ca×(y1+y2)+cb×y3 and the image signal Cy has a signal level ca×(y4+y5+y6)+cb×y7.

For the fourth column, the image signal Cx has a signal level ca×(y4+y5)+cb×(y6+y7) and the image signal Cy has a signal level ca×(y1+y2)+cb×y3. For the fifth column, the image signal Cx has a signal level ca×y1+cb×(y2+y3) and the image signal Cy has a signal level ca×(y4+y5)+cb×(y6+y7). For the sixth column, the image signal Cx has a signal level ca×y4+cb×(y5+y6+y7) and the image signal Cy has a signal level ca×y1+cb×(y2+y3). For the seventh column, the image signal Cx has a signal level cb×(y1+y2+y3) and the image signal Cy has a signal level ca×y4+cb×(y5+y6+y7).

4. Selector Circuits

In the selector circuit 12a, according to the control signal fed thereto from the edge detection filter 7a, either the outputs of the small-tap-number color separation filters 8a and 10a or the outputs of the large-tap-number color separation filters 9a and 11a are chosen and fed to the adder circuit 13a and to the subtractor circuit 14a. Here, the selector circuit 12a is controlled by the control signal fed thereto from the edge detection filter 7a in such a way that the large-tap-number color separation filters 9a and 11a are chosen when an edge is encountered. Specifically, when the result E1 of the calculation performed by the edge detection filter 7a fulfills $-Th \leq E1 \leq Th$, the terminals "a" of the switches SW1a and SW2a are connected to their respective common terminals so that the outputs of the small-tap-number color separation filters 8a and 10a are chosen; by contrast, when the result E1 of the calculation performed by the edge detection filter 7a fulfills $E1 \leq -Th$ or $E1 \geq Th$, the terminals "b" of the switches SW1a and SW2a are connected to their respective common terminals so that the outputs of the large-tap-number color separation filters 9a and 11a are chosen.

Thus, when the edge detection filter 7a yields calculation results as shown in FIG. 4B, for the first to third and sixth to eighth columns, the image signals Cx and Cy, as shown in FIGS. 4E and 4F, output from the small-tap-number color separation filters 8a and 10a are chosen, and, for the fourth and fifth columns, the image signals Cx and Cy, as shown in FIGS. 4I and 4J, output from the large-tap-number color separation filters 9a and 11a are chosen.

Figure 4K:
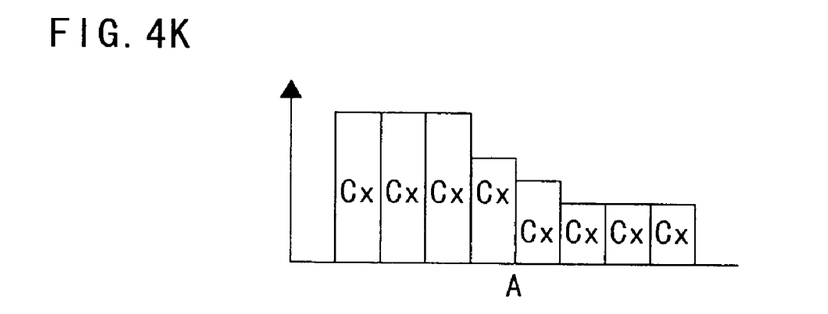
Figure 4L:
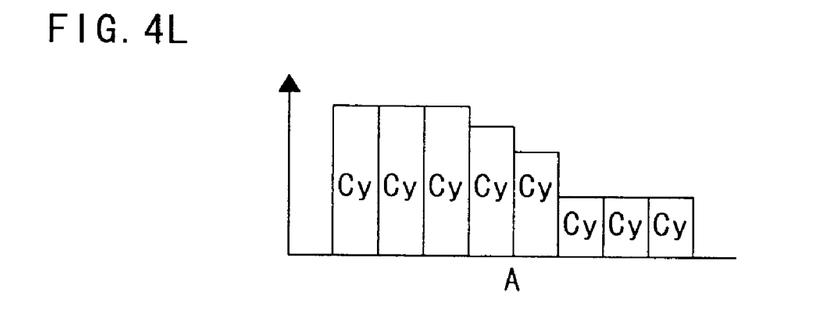

As a result, the selector circuit 12a feeds image signals Cx and Cy as shown in FIGS. 4K and 4L to the adder circuit 13a and to the subtractor circuit 14a, Specifically, for the first to third columns, the image signals Cx and Cy both have a signal level ca×x1, and, for the sixth to eighth columns, the image signals Cx and Cy both have a signal level cb×x1. For the fourth column, the image signal Cx has a signal level ca×(y4+y5)+cb×(y6+y7) and the image signal Cy has a signal level ca×(y1+y2)+cb×y3. For the fifth column, the image signal Cx has a signal level ca×y1+cb×(y2+y3) and the image signal Cy has a signal level ca×(y4+y5)+cb×(y6+y7).

As the selector circuit 12a outputs image signals Cx and Cy in this way, when the image signals Cx are image signals C1 and C2, the adder circuit 13a outputs a luminance signal YLa that is equal to C1+C2 and the subtractor circuit 14a outputs a color separation signal Cra that is equal to C2−C1; when the image signals Cx are image signals C3 and C4, the adder circuit 13a outputs a luminance signal YLa that is equal to C3+C4 and the subtractor circuit 14a outputs a color separation signal Cba that is equal to C4−C3.

Figure 4M:
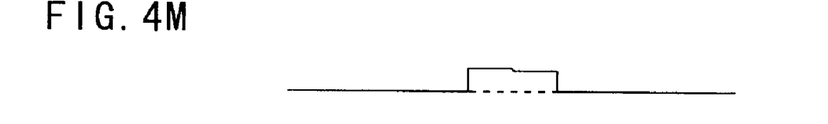

Thus, when the selector circuit 12a outputs image signals Cx and Cy as shown in FIGS. 4K and 4L, the subtractor circuit 14a outputs signals as shown in FIG. 4M. Specifically, the color separation signals Cra or Crb have a signal level 0 for the first to third and sixth to eighth columns, a signal level |[ca×(y4+y5)+cb×(y6+y7)]−[ca×(y1+y2)+cb×y3]| for the fourth column, and a signal level |(ca×y1+cb×(y2+y3))−[ca×(y4+y5)+cb×(y6+y7)]|.

The edge detection filters 7b and 7c, the color separation filters 8b, 8c, 9b, 9c, 10b, 10c, 11b, and 11c, and the selector circuits 12b and 12c operate in the same manner as the edge detection filter 7a, the color separation filters 8a., 9a, 10a, and 11a, and the selector circuit 12a described above. When the selector circuits 12b and 12c output image signals C1 and C2, the adder circuits 13b and 13c output luminance signals YLb and YLc, respectively, each having a signal level C1+C2, and the subtractor circuits 14b and 14c output color separation signals Crb and Crc, respectively, each having a signal level C1−C1. By contrast, when the selector circuits 12b and 12c output image signals C3 and C4, the adder circuits 13b and 13c output luminance signals YLb and YLc, respectively, each having a signal level C3+C4, and the subtractor circuits 14b and 14c output color separation signals Cbb and Cbc, respectively, each having a signal level C4−C3.

In this way, by using, where an edge is encountered, the outputs of the large-tap-number color separation filters, which deviate only slightly from the ideal values, and using, where no edge is encountered, the outputs of the small-tap-number color separation filters, which are almost equal to the ideal values, it is possible to make the signal levels of the color separation signals Cr and Cb closer to their ideal values and thereby reduce false coloring in the horizontal direction. It is to be understood that the color separation filters may have any number of taps other than three and seven specifically described above, as long as the large-tap-number color separation filters have a larger number of taps than the small-tap-number color separation filters.

How False Coloring in the Horizontal Direction is Reduced

Reduction of false coloring in the vertical direction is performed by the VLPF 15, the ratio calculator circuit 16, the adder circuit 17, and the multiplier circuit 18. The luminance signals YLa, YLb, and YLc output from the adder circuits 13a, 13b, and 13c as described above are fed to the VLPF 15 and to the ratio calculator circuit 16. Here, when the luminance signal YLa is a signal that is equal to C1+C2, the luminance signal YLb is a signal that is equal to C3+C4, and the luminance signal YLc is a signal that is equal to C1+C2. By contrast, when the luminance signal YLa is a signal that is equal to C3+C4, the luminance signal YLb is a signal that is equal to C1+C2, and the luminance signal YLc is a signal that is equal to C3+C4.

When the adder circuit 13a outputs a luminance signal YLa that is equal to C1+C2, the subtractor circuits 14a and 14c output color separation signals Cra and Crc, respectively, and the subtractor circuit 14b outputs a color separation signal Cbb. By contrast, when the adder circuit 13a outputs a luminance signal YLa that is equal to C3+C4, the subtractor circuits 14a and 14c output color separation signals Cba and Cbc, respectively, and the subtractor circuit 14b outputs a color separation signal Crb.

From the luminance signals YLa, YLb, and YLc, the VLPF 15 produces a luminance signal YL and outputs it. This luminance signal YL is produced by performing calculation YL=2×(1−α) YLb+α (YLa+YLc), where α fulfills the relation 0<α<1. The luminance signal YL thus produced is, as described previously, fed to the RGB matrix circuit 4. On the other hand, from the luminance signals YLa, YLb, and YLc, the ratio calculator circuit 16 produces a ratio β to be fed to the multiplier circuit 18 to multiply therewith the signal output from the adder circuit 17. If it is assumed that the luminance signals YLa, YLb, and YLc have signal levels yLa, yLb, and yLc, then the ratio β is produced by performing calculation β=yLb/(yLa+yLc).

Figure 5A:
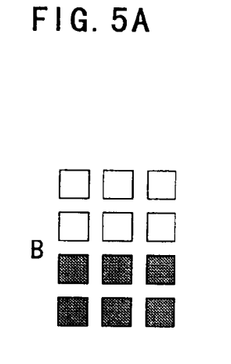
FIGS. 5A to 5F are diagrams showing how signals are processed by the color separator circuit shown in FIG. 2.

Now, with reference to FIGS. 5A to 5F, the color separation signals Cr and Cb, which are fed to the RGB matrix circuit together with the luminance signal YL, will be described. Suppose that an edge is encountered at a position B between the second and third rows as shown in FIG. 5A in the same manner as shown in FIG. 8A. Here, it is assumed that the subtractor circuits 14a, 14b, and 14c produce color separation signals Cz from the image signals of the first and third rows and color separation signals Cw from the image signals of the second and fourth rows. It is to be noted that, when the color separation signals Cz are color separation signals Cr, the color separation signals Cw are color separation signals Cb and, when the color separation signals Cz are color separation signals Cb, the color separation signals Cw are color separation signals Cr.

Figure 5B:
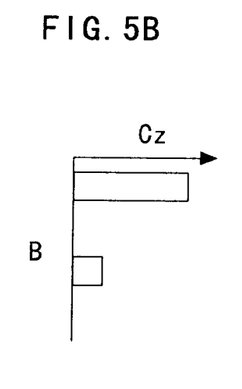
Figure 5C:
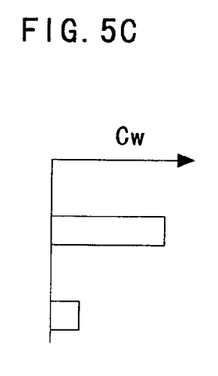
Figure 5D:
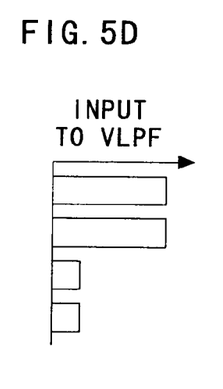

As image signals including an edge as shown in FIG. 5A are fed to the color separator circuit 3, as shown in FIGS. 5B, 5C, and 5D, when the image signal of the first or third row is fed in from the line memory 1, the subtractor circuit 14b outputs an image color separation signal Cz and, when the image signal of the second or fourth row is fed in from the line memory 1, the subtractor circuit 14b outputs an image color separation signal Cw.

When the color separator circuit 3 is fed with the image signal of the first row shown in FIG. 5A from the line memory 2, the image signal of the second row shown in FIG. 5A from the line memory 1, and the image signal of the third row shown in FIG. 5A from the CCD, the adder circuit 17 and the multiplier circuit 18 operate in the following manner. This time, the subtractor circuits 14a and 14c output color separation signals Cz and the subtractor circuit 14b outputs a color separation signal Cw. Here, let the color separation signals Cz output from the subtractor circuit 14a be color separation signals Cza and the color separation signals Cz output from the subtractor circuit 14c be color separation signals Czb.

Figure 5E:
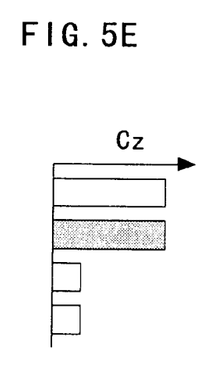

Then, if it is assumed that the color separation signals Cza and Czb have signal levels cza and czb, the adder circuit 17 adds together the color separation signals Cza and Czb output from the subtractor circuits 14a and 14c, and feeds the resulting signal cza+czb to the multiplier circuit 18. When the signals fed from the adder circuits 13a, 13b, and 13c to the VLPF 15 have signal levels Ya, Ya, and Yb as shown in FIGS. 5B, 5C, and 5D, the ratio calculator circuit 16 feeds a ratio β that is equal to Ya/(Ya+Yb) to the multiplier circuit 18. As a result, as shown in FIG. 5E, the multiplier circuit 18 outputs a color separation signal Cz that is equal to (cza+czb)×Ya/(Ya+Yb).

Similarly, when the color separator circuit 3 is fed with the image signal of the second row shown in FIG. 5A from the line memory 2, the image signal of the third row shown in FIG. 5A from the line memory 1, and the image signal of the fourth row shown in FIG. 5A from the CCD, the adder circuit 17 and the multiplier circuit 18 operate in the following manner. This time, the subtractor circuits 14a and 14c output color separation signals Cw and the subtractor circuit 14b outputs a color separation signal Cz. Here, let the color separation signals Cw output from the subtractor circuit 14a be color separation signals Cwa and the color separation signals Cw output from the subtractor circuit 14c be color separation signals Cwb.

Then, if it is assumed that the color separation signals Cwa and Cwb have signal levels cwa and cwb, the adder circuit 17 adds together the color separation signals Cwa and Cwb output from the subtractor circuits 14a and 14c, and feeds the resulting signal cwa+cwb to the multiplier circuit 18. When the signals fed from the adder circuits 13a, 13b, and 13c to the VLPF 15 have signal levels Ya, Yb, and Yb as shown in FIGS. 5B, 5C, and 5D, the ratio calculator circuit 16 feeds a ratio β that is equal to Yb/(Ya+Yb) to the multiplier circuit 18. As a result, as shown in FIG. 5F, the multiplier circuit 18 outputs a color separation signal Cw that is equal to (cwa+cwb)×Yb/(Ya+Yb).

Figure 5F:
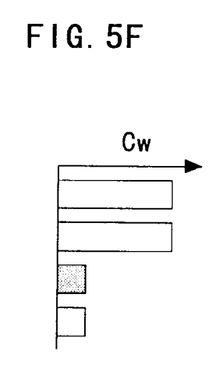

Moreover, if it is assumed that, of the signals fed to the VLPF 15, those corresponding to the image signals of the second and the preceding rows have a signal level Ya and those corresponding to the image signals of the third and the succeeding rows have a signal level Yb, the color separation signal Cw of the first row is made to have a signal level equal to that of the color separation signal Cw of the second row as shown in FIG. 5F as a result of the signal output from the adder circuit 17 being multiplied by a ratio β of ½ by the multiplier circuit 18. Similarly, the color separation signal Cz of the fourth row is made to have a signal level equal to that of the color separation signal Cz of the third row as shown in FIG. 5E as a result of the signal output from the adder circuit 17 being multiplied by a ratio β of ½ by the multiplier circuit 18.

In this way, it is possible to make the signal levels of the color separation signals Cr and Cb closer to the level of the brightness of the light incident on the CCD and thereby reduce false coloring as compared with conventional methods whereby the signal levels of the color separation signals Cr and Cb are calculated by linear polarization.

Advantages of the Invention

As described above, according to the present invention, an edge is detected, and the image signals that correspond to the edge are processed by the use of large-tap-number color separation filters, which help reduce false coloring in the image signals corresponding to an edge as compared with small-tap-number color separation filters. On the other hand, the image signals other than those corresponding to an edge are processed by the use of small-tap-number color separation filters, which help reduce false coloring in the image signals other than those corresponding to an edge as compared with large-tap-number color separation filters. In this way, by switching color separation filters for processing image signals according to the brightness of the light incident on where image sensing is currently being performed, it is possible to reduce false coloring and thus perform color separation by interpolation in a manner closer to an ideal. Moreover, by performing interpolation of the color separation signals according to the ratio of the signal levels of the luminance signals, it is possible to make the color separation signals have signal levels closer to their ideal values and thereby reduce false coloring as compared with conventional methods whereby interpolation is achieved by linear interpolation.

What is claimed is:

1. A color separator circuit for performing color separation on image signals fed thereto from a solid-state image-sensing device having pixels provided with a plurality of types of color filters, comprising:
    a contour detector for detecting a contour of a subject sensed by the solid-state image-sensing device by recognizing variations in signals levels of the image signals fed from the solid-state image-sensing device;
    a first color separation filter for correcting the image signals fed from the solid-state image-sensing device by correcting each image signal based on a plurality of preceding and succeeding image signals;
    a second color separation filter for correcting the image signals fed from the solid-state image-sensing device by correcting each image signal based on a plurality of preceding and succeeding image signals; and
    a selector for selecting the second color separation filter when correcting image signals that represent a portion of an image that corresponds to the contour detected by the contour detector and selecting the first color separation filter when correcting image signals that represent a portion of the image other than the portion corresponding to the contour,
    wherein the first color separation filter uses a smaller number of image signals to correct an image signal than the second color separation filter.

2. A color separator circuit for performing color separation on image signals fed thereto from a solid-state image-sensing device having pixels provided with different types of color filters that are arranged in a recurrent pattern in a vertical direction, comprising:
    a luminance signal generator for generating luminance signals from the image signals fed from the solid-state image-sensing device;
    a first color separation signal generator for producing, for each of the image signals fed thereto from the solid-state image-sensing device, a first color separation signal according to the type of the color filter provided for a target pixel that is currently yielding the image signal; and
    a second color separation signal generator for producing, from the image signals fed thereto from the target pixel and from a pixel vertically adjacent thereto, a second color separation signal for the target pixel according to the type of color filter provided for the vertically adjacent pixel based on relationship between signal levels of luminance signals generated for the target pixel and for the vertically adjacent pixel by the luminance signal generator.

3. A color separator circuit as claimed in claim 2, wherein the second color separation signal for the target pixel is produced in such a way that a ratio of a signal level of the second color separation signal produced for the target pixel by the second color separation signal generator to a signal level of the first color separation signal produced for the vertically adjacent pixel by the first color separation signal generator is equal to a ratio between signal levels of the luminance signals generated for the target pixel and for the vertically adjacent pixel by the luminance signal generator.

4. A color separator circuit for performing color separation on image signals fed thereto from a solid-state image-sensing device having pixels provided with two different types of color filters that are arranged alternately in a horizontal direction, comprising:
    a contour detector for detecting a contour of a subject sensed by the solid-state image-sensing device by recognizing variations in signals levels of the image signals fed from the solid-state image-sensing device;
    a first small-tap-number color separation filter for correcting, for each of pixels provided with one of the two types of color filters, an image signal output from the pixel based on image signals output from a plurality of pixels horizontally neighboring the pixel;
    a second small-tap-number color separation filter for producing, for each of pixels provided with one of the two types of color filters, an image signal ascribable to the other type of color filter by performing interpolation based on image signals output from a plurality of pixels horizontally neighboring the pixel;
    a first large-tap-number color separation filter, having a larger number of taps than the first small-tap-number color separation filter, for correcting, for each of pixels provided with one of the two types of color filters, an image signal output from the pixel based on image signals output from a plurality of pixels horizontally neighboring the pixel;
    a second large-tap-number color separation filter, having a larger number of taps than the second small-tap-number color separation filter, for producing, for each of pixels provided with one of the two types of color filters, an image signal ascribable to the other type of color filter by performing interpolation based on image signals output from a plurality of pixels horizontally neighboring the pixel;
    a selector for selecting, as first and second signals, signals output from the first and second large-tap-number color separation filters when correcting image signals that represent a portion of an image that corresponds to the contour detected by the contour detector and signals output from the first and second small-tap-number color separation filters when correcting image signals that represent a portion of the image other than the portion corresponding to the contour;
    an adder for adding together the first and second signals output from the selector to output luminance signals; and a subtractor for calculating a difference between the first and second signals output from the selector to output color separation signals, wherein the first and second small-tap-number color separation filters, the first and second large-tap-number color separation filters, the selector, the adder, and the subtractor constitute a horizontal-direction false coloring suppressor that alleviates false coloring in a horizontal direction.

5. A color separator circuit as claimed in claim 4, wherein, as the horizontal-direction false coloring suppressor, three horizontal-direction false coloring suppressors are provided, namely a first, a second, and a third horizontal-direction false coloring suppressor, wherein the first, second, and third horizontal-direction false coloring suppressors each receive one of three image signals output from three vertically adjacent pixels of the solid-state image-sensing device, wherein the color separation signals output from the subtractor of the second horizontal-direction false coloring suppressor are output as first color separation signals, and wherein the color separation signals output from the subtractors of the first and third horizontal-direction false coloring suppressors are corrected based on signal levels of the luminance signals individually output from the adder circuits of the first, second, and third horizontal-direction false coloring suppressors so as to be output as second color separation signals.

6. A color separator circuit as claimed in claim 5, further comprising:

an adder circuit for adding together the color separation signals output from the subtractors of the first and third horizontal-direction false coloring suppressors; and a multiplier circuit for multiplying signals output from the adder circuit by a value based on the signal levels of the luminance signals output from the adder circuits of the first, second, and third horizontal-direction false coloring suppressors.

7. A color separator circuit as claimed in claim 6, wherein, assuming that the signal levels of the luminance signals output from the adder circuits of the first, second, and third horizontal-direction false coloring suppressors are yLa, yLb, and yLc, respectively, the value K by which the multiplier circuit multiplies is given as K=yLb/(yLa+yLc).

8. A chrominance signal processing device that produces chrominance signals based on signals output from a color separator circuit provided therein, said color separator circuit comprising:

a contour detector for detecting a contour of a subject sensed by a solid-state image-sensing device having pixels provided with a plurality of types of color filters, said contour detector detecting the contour by recognizing variations in signals levels of image signals fed thereto from the solid-state image-sensing device;

a first color separation filter for correcting the image signals fed from the solid-state image-sensing device by correcting each image signal based on a plurality of preceding and succeeding image signals;

a second color separation filter for correcting the image signals fed from the solid-state image-sensing device by correcting each image signal based on a plurality of preceding and succeeding image signals; and a selector for selecting the second color separation filter when correcting image signals that represent a portion of an image that corresponds to the contour detected by the contour detector and selecting the first color separation filter when correcting image signals that represent a portion of the image other than the portion corresponding to the contour, wherein the first color separation filter uses a smaller number of image signals to correct an image signal than the second color separation filter.

9. A chrominance signal processing device that produces chrominance signals based on signals output from a color separator circuit provided therein, said color separator circuit comprising:

a luminance signal generator for generating luminance signals from image signals fed thereto from a solid-state image-sensing device having pixels provided with different types of color filters that are arranged in a recurrent pattern in a vertical direction;

a first color separation signal generator for producing, for each of the image signals fed thereto from the solid-state image-sensing device, a first color separation signal according to the type of the color filter provided for a target pixel that is currently yielding the image signal; and a second color separation signal generator for producing, from the image signals fed thereto from the target pixel and from a pixel vertically adjacent thereto, a second color separation signal for the target pixel according to the type of color filter provided for the vertically adjacent pixel based on relationship between signal levels of luminance signals generated for the target pixel and for the vertically adjacent pixel by the luminance signal generator.

10. A chrominance signal processing device as claimed in claim 9, wherein the color separator circuit produces the second color separation signal for the target pixel in such a way that a ratio of a signal level of the second color separation signal produced for the target pixel by the second color separation signal generator to a signal level of the first color separation signal produced for the vertically adjacent pixel by the first color separation signal generator is equal to a ratio between signal levels of the luminance signals generated for the target pixel and for the vertically adjacent pixel by the luminance signal generator.

11. A chrominance signal processing device that produces chrominance signals based on signals output from a color separator circuit provided therein, said color separator circuit comprising:

a contour detector for detecting a contour of a subject sensed by a solid-state image-sensing device having pixels provided with two different types of color filters that are arranged alternately in a horizontal direction, said contour detector detecting the contour by recognizing variations in signals levels of image signals fed thereto from the solid-state image-sensing device;

a first small-tap-number color separation filter for correcting, for each of pixels provided with one of the two types of color filters, an image signal output from the pixel based on image signals output from a plurality of pixels horizontally neighboring the pixel;

a second small-tap-number color separation filter for producing, for each of pixels provided with one of the two types of color filters, an image signal ascribable to the other type of color filter by performing interpolation based on image signals output from a plurality of pixels horizontally neighboring the pixel;

a first large-tap-number color separation filter, having a larger number of taps than the first small-tap-number color separation filter, for correcting, for each of pixels provided with one of the two types of color filters, an image signal output from the pixel based on image signals output from a plurality of pixels horizontally neighboring the pixel;

a second large-tap-number color separation filter, having a larger number of taps than the second small-tap-number color separation filter, for producing, for each of pixels provided with one of the two types of color filters, an image signal ascribable to the other type of color filter by performing interpolation based on image signals output from a plurality of pixels horizontally neighboring the pixel;

a selector for selecting, as first and second signals, signals output from the first and second large-tap-number color separation filters when correcting image signals that represent a portion of an image that corresponds to the contour detected by the contour detector and signals output from the first and second small-tap-number color separation filters when correcting image signals that represent a portion of the image other than the portion corresponding to the contour;

an adder for adding together the first and second signals output from the selector to output luminance signals; and a subtractor for calculating a difference between the first and second signals output from the selector to output color separation signals, wherein the first and second small-tap-number color separation filters, the first and second large-tap-number color separation filters, the selector, the adder, and the subtractor constitute a horizontal-direction false coloring suppressor that alleviates false coloring in a horizontal direction.

12. A chrominance signal processing device as claimed in claim 11, wherein, in the color separator circuit, as the horizontal-direction false coloring suppressor are provided three horizontal-direction false coloring suppressors, namely a first, a second, and a third horizontal-direction false coloring suppressor, wherein the first, second, and third horizontal-direction false coloring suppressors each receive one of three image signals output from three vertically adjacent pixels of the solid-state image-sensing device, wherein the color separation signals output from the subtractor of the second horizontal-direction false coloring suppressor are output as first color separation signals, and wherein the color separation signals output from the subtractors of the first and third horizontal-direction false coloring suppressors are corrected based on signal levels of the luminance signals individually output from the adder circuits of the first, second, and third horizontal-direction false coloring suppressors so as to be output as second color separation signals.

13. A chrominance signal processing device as claimed in claim 12, wherein the color separator circuit further comprises:

an adder circuit for adding together the color separation signals output from the subtractors of the first and third horizontal-direction false coloring suppressors; and a multiplier circuit for multiplying signals output from the adder circuit by a value based on the signal levels of the luminance signals output from the adder circuits of the first, second, and third horizontal-direction false coloring suppressors.

14. A color separator circuit as claimed in claim 13, wherein, assuming that the signal levels of the luminance signals output from the adder circuits of the first, second, and third horizontal-direction false coloring suppressors are yLa, yLb, and yLc, respectively, the value K by which the multiplier circuit multiplies is given as K=yLb/(yLa+yLc).

* * * * *